United States Patent
Moses et al.

(10) Patent No.: US 9,971,021 B2
(45) Date of Patent: May 15, 2018

(54) RADAR-BASED DETECTION AND IDENTIFICATION FOR MINIATURE AIR VEHICLES

(75) Inventors: Allistair A. Moses, Denver, CO (US); Matthew J. Rutherford, Denver, CO (US); Kimon P. Valavanis, Denver, CO (US)

(73) Assignee: Colorado Seminary Which Owns and Operates the University of Denver, Denver, CO (US)

( * ) Notice: Subject to any disclaimer, the term of this patent is extended or adjusted under 35 U.S.C. 154(b) by 578 days.

(21) Appl. No.: 14/113,998

(22) PCT Filed: Apr. 25, 2012

(86) PCT No.: PCT/US2012/035022
§ 371 (c)(1),
(2), (4) Date: Jan. 7, 2014

(87) PCT Pub. No.: WO2012/149035
PCT Pub. Date: Nov. 1, 2012

(65) Prior Publication Data
US 2014/0139366 A1    May 22, 2014

Related U.S. Application Data

(60) Provisional application No. 61/478,681, filed on Apr. 25, 2011.

(51) Int. Cl.
| | | |
|---|---|---|
| *G01S 13/04* | (2006.01) | |
| *G01S 7/41* | (2006.01) | |
| *G01S 13/93* | (2006.01) | |
| *G01S 7/03* | (2006.01) | |
| *G01S 7/35* | (2006.01) | |
| *G01S 13/536* | (2006.01) | |

(52) U.S. Cl.
CPC ............... *G01S 7/41* (2013.01); *G01S 7/032* (2013.01); *G01S 7/352* (2013.01); *G01S 7/412* (2013.01); *G01S 13/04* (2013.01); *G01S 13/536* (2013.01); *G01S 13/9303* (2013.01)

(58) Field of Classification Search
CPC .... G01S 13/04; G01S 13/536; G01S 13/9303; G01S 7/032; G01S 7/352; G01S 7/41; G01S 7/412
USPC ............................................. 342/27, 63, 175
See application file for complete search history.

(56) References Cited

U.S. PATENT DOCUMENTS

| | | | |
|---|---|---|---|
| 5,431,568 A * | 7/1995 | Fey .................. | G01S 7/4052 342/169 |
| 7,180,442 B1 * | 2/2007 | Nguyen ................ | G01S 7/41 324/76.12 |
| 7,289,060 B1 | 10/2007 | Abatzoglou et al. | |

(Continued)

*Primary Examiner* — Timothy A Brainard
(74) *Attorney, Agent, or Firm* — Neugeboren O'Dowd PC

(57) ABSTRACT

An unmanned aerial vehicle (UAV) radar apparatus may be used in aircraft detection and avoidance. The radar apparatus may include an RF front end configured to transmit and receive RF signals, a filtering module coupled with the RF front end module that filters RF signals received at the RF front end module, and a target data processing module coupled with the filtering module that detects and identifies one or more targets based on the filtered RF signals. Avoidance procedures may be initiated based on the identification and detection of one or more targets.

20 Claims, 9 Drawing Sheets

(56) References Cited

U.S. PATENT DOCUMENTS

| | | | | |
|---|---|---|---|---|
| 7,456,803 B1* | 11/2008 | Sievenpiper | ............ | H01Q 15/02 343/700 MS |
| 2008/0169962 A1* | 7/2008 | Rees | ........................ | H01Q 1/28 342/29 |
| 2009/0021720 A1* | 1/2009 | Hecker | .............. | B60G 17/0165 356/4.01 |
| 2009/0135046 A1* | 5/2009 | Steele | ..................... | G01S 7/414 342/27 |
| 2010/0121574 A1* | 5/2010 | Ariyur | ................... | G05D 1/101 701/301 |

* cited by examiner

RADAR-BASED DETECTION AND IDENTIFICATION FOR MINIATURE AIR VEHICLES

CROSS REFERENCE TO RELATED APPLICATIONS

The present application for patent claims priority to U.S. Provisional Patent Application No. 61/478,681 entitled "RADAR-BASED DETECTION AND IDENTIFICATION FOR MINIATURE AIR VEHICLES" filed Apr. 25, 2011, and assigned to the assignee hereof and hereby expressly incorporated by reference herein.

FIELD

Embodiments of the present invention generally relate to radar systems for unmanned aerial vehicles.

BACKGROUND

Unmanned aerial vehicles (UAVs) are well known, remotely operated platforms that may be used for many tasks. UAVs can be relatively small, allowing for relatively small landing and take-off areas, and can have a relatively small radar cross section (RCS) thus allowing operation in potentially dangerous areas with reduced likelihood of detection and without risking a human pilot. Such UAVs are commonly used in remote surveillance or monitoring operations, to obtain intelligence about activity in an area, or monitor the status of assets or people in a particular area. For example, UAVs may be used in intelligence gathering operations at relatively low altitudes in hostile territory. Another exemplary application of a UAV is monitoring operations, such as monitoring of a border between countries or monitoring assets like pipelines or a convoy which may be targeted by hostile parties. UAVs may be fixed wing aircraft, or rotary-wing aircraft. Furthermore, UAVs may be operated with reduced requirements for take-off and landing areas.

Unmanned aerial vehicles (UAVs) are becoming attractive solutions for non-military applications such as traffic monitoring, fire protection, and border patrol, to name a few examples. UAVs are generally well known for use in military applications, and such military UAVs are generally powerful enough to carry advanced avionics equipment similar to that used in manned vehicles, are typically piloted by a team of highly trained individuals, and require a sufficient capital investment to operate. In non-military applications, UAVs may be less powerful and/or have reduced capability to carry and support avionics equipment similar to that used in manned vehicles.

SUMMARY

A light weight, radar system, such as an X-Band (10.5 GHz) radar system, for use on a small-scale aircraft is disclosed. The disclosed radar of some embodiments is small enough to be carried by a miniature unmanned aerial vehicle (UAV), and is capable of differentiating miniature aircraft by their Doppler signature. Hardware and software design of some embodiments also provide signature matching algorithms for differentiating aircraft by their Doppler signature.

According to one set of embodiments, an unmanned aerial vehicle (UAV) radar apparatus, comprises an RF front end module configured to transmit and receive RF signals, a filtering module coupled with the RF front end module that filters RF signals received at the RF front end module, and a target data processing module coupled with the filtering module that detects and identifies one or more targets based on the filtered RF signals. In some embodiments, the RF front end module, filtering module, and processing module are modular components, which may be located at different locations on the UAV to provide enhanced mass and volume balancing. In various embodiments, the RF front end module includes a waveguide-based microwave device, such as a gunnplexer, for example. According to some embodiments, the target data processing module is configured to identify one or more signatures based on the filtered RF signals and identify one or more targets based on the signatures, such as through signature matching algorithms for differentiating aircraft by their Doppler signature. A memory may be coupled with the target data processing module, which may include pre-recorded signatures of vehicle classes of interest. In some embodiments, a control module may be coupled with the target data processing module, and be operable to control the UAV to perform avoidance maneuvers responsive to the identification of one or more signatures.

In another set of embodiments, a method for target detection in an unmanned aerial vehicle (UAV), comprises receiving RF signals at an antenna located on the UAV, filtering the received RF signals to frequencies of interest, comparing the filtered RF signals to known signal fingerprints, and identifying one or more targets based on the comparison. In some embodiments, comparing includes executing signature matching algorithms for differentiating aircraft by their Doppler signature. Comparing may be accomplished through accessing a memory coupled with the target data processing module, which may include a plurality of pre-recorded signatures of vehicle classes of interest. In some embodiments, the method may further include controlling the UAV to avoid one or more targets based on the identifying, such as through controlling the UAV to change one or more of altitude, direction of travel, or speed.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
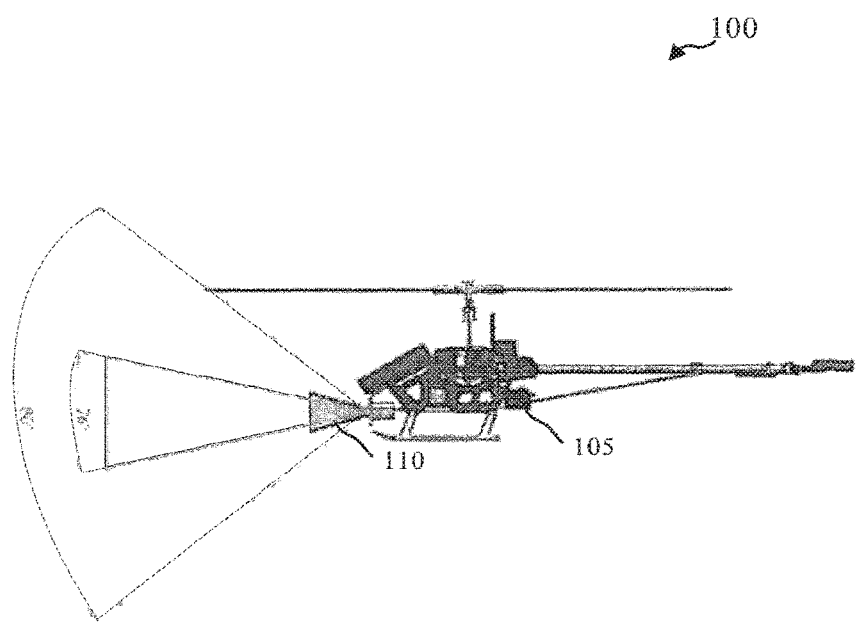
FIG. 1 is an illustration of an exemplary unmanned aerial vehicle and a radar of one set of embodiments.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The present disclosure recognizes that in many civilian applications for UAVs it may be desirable to use smaller systems, so as to provide a Maximum Take-Off Weight (MTOW) of, for example, less than about 20 kilograms. It may also be desirable that civilian UAVs be safely operated by individuals or small teams with little formal training. Due to the perceived risks to public safety introduced by UAVs, and to the relative lack of training of their crews, it may be desirable to equip such civilian UAVs with increased levels of autonomy and intelligence, such as with regard to risk mitigation capabilities, for example. Additionally, it may be desirable to provide for UAV integration into the National Air Space (NAS) with multiple, complementary sense-and-avoid mechanisms (e.g., both vision- and radar-based systems). The present disclosure provides, according to various embodiments, sensors that are (1) suitable for small UAV integration (i.e, low mass and volume), (2) sensitive enough to detect other UAV-sized vehicles, and (3) intelligent enough to identify and differentiate between different classes.

Various types of sensors are well known and useful for detection of objects, such as aerial and/or ground vehicles or objects. For example, cameras and other optical systems, radar-based systems, and sonar systems may provide sensing capability. Each type of system provides different types of information that may be used to detect other UAV-sized aerial vehicles, and each type of system may have various advantages and drawbacks. For example, visible spectrum cameras and other optical equipment may be adversely affected by changing sunlight conditions and other environmental factors (e.g., smoke, fog, dust), limiting their ability to detect other vehicles. Optical systems using other parts of the spectrum (i.e., ultra-violet and infrared) may be used in conjunction with visible spectrum data to compensate for some of these limitations. Optical systems may, however, require computationally intensive operations to analyze data and provide detection of UAV-sized vehicles. In various embodiments disclosed herein, one or more types of sensor systems, such as optical systems and/or sonar-based systems, may be used in conjunction with radar-based detection systems of various embodiments that are described herein.

The present disclosure provides, according to various embodiments, radar systems adapted to perform both target detection and identification, and that are small and lightweight enough to be carried by a relatively small UAV. The systems described in embodiments herein may address the airborne sense-and-avoid problem, and in some embodiments may act as a Synthetic Aperture Radar (SAR) imager or radar altimeter.

Within the realm of manned, commercial aircraft, mid-air collisions are mitigated through a system known as the Traffic Collision Avoidance System (TCAS) and its successor, Automatic Dependent Surveillance-Broadcast (ADS-B). TCAS and ADS-B function by means of on-board RF transponders and cockpit instruments that direct the pilot to make altitude changes to avoid a collision. TCAS systems are widely adopted for commercial aircraft, although the use of the most basic TCAS systems is not required for piston engine aircraft with fewer than 10 seats according to present day regulations, although this class of aircraft composes a significant percentage of the world's aircraft. Furthermore, most UAV systems are not equipped with the TCAS system. The present disclosure recognizes that if UAV systems that are desired to co-exist with general aviation aircraft were equipped with simple radar systems, then a new option for improving safety would be available. Furthermore, many present day systems that may be used as UAV radar systems, have a relatively high cost and high mass, thus making them impractical for many miniature UAV applications.

Various embodiments described herein allow collision avoidance behaviors on UAVs with low-cost hardware enabled to provide integration into the National Airspace System (NAS). The solution according to some embodiments provides that, when a collision course between a manned and an unmanned vehicle is detected, the manned vehicle will automatically be given priority and the unmanned vehicle will automatically perform a collision avoidance maneuver. This approach may provide enhanced effectiveness because manned aircraft typically are less capable of the rapid, sustained high-g, maneuvers that some UAVs can perform. Moreover, an automated system as described for various embodiments may be capable of continuous monitoring throughout the entire flight regardless of operator workload or mental state.

For example, with reference to FIG. 1, an exemplary system 100 includes a miniature unmanned rotorcraft UAV 105 that is configured with a radar system 110 according to an embodiment. Such an UAV may share airspace with, for example, a Cessna 172R manned aircraft. The unmanned rotorcraft UAV 105 may be a relatively small vehicle, such as an Align TRex450Pro helicopter, and may be configured, for example, with a flying weight of 0.75 kg and a maximum thrust of 1.1 kg (10.78N) measured at 1600 m above sea level. As common TCAS avoidance maneuvers are altitude changes, the maximum vertical dimension of the manned aircraft is considered, which for the example of the Cessna 172R is 2.72 m. To cover this vertical distance, the UAV 105 would require no more than 0.624 seconds to evade the manned aircraft. Further, for this example, it may be assumed that the Cessna's cruising speed is 140 mph (62.6 m/s), which is typical of small single piston engine craft, and at this velocity, the manned aircraft would have covered approximately 39 m. Using these figures, an estimate of the minimum required radar detection/identification range may be calculated. Assuming a maximum range of 500 m against a Cessna 172R-sized target and a 1 Hz update rate, the altitude separation factor of safety is 125 (i.e., the UAV 105 equipped with such a system could cover 125 times the distance required to avoid a collision with any part of the Cessna).

With continued reference to FIG. 1, radar system 110 may include components that utilize electro-magnetic energy (typically in the microwave range) to gather information on remote objects by analyzing the characteristics of their reflected energy. Many large scale radar installations utilize some form of pulsed radar arrangement to extract information about the targets by timing the radar returns. However, the complexity, limited range resolution, and large minimum range of pulsed radar systems make such systems difficult to effectively implement in miniature UAV applications such as in FIG. 1. According to some embodiments, radar system 110 is configured as a Continuous Wave (CW) radar. CW radar systems can be divided into two generalized forms: Frequency Modulated Continuous Wave radar (FMCW), and Doppler radar. The former utilizes periodic variations in frequency to determine the range to the target while the latter relies on the Doppler Effect to isolate moving targets and determine their velocities relative to the radar antenna, but it is incapable of determining the range to the target. The radar system 110 of various embodiments is capable of both FMCW and Doppler operation. In some embodiments, the Doppler operation mode is utilized in several embodiments. Doppler operation is based on the following equations:

$$\Delta F = F_t \left( \frac{2v}{c-v} \right) \quad (1)$$

$$\Delta F = 70.048v \quad (2)$$

A basic premise of Doppler radar operation is the Doppler frequency shift generated by some combination of moving sources, and/or targets. For co-located transmit and receive antennas, Equation 1 defines the Doppler shift as a function of the target velocity v, the transmitted frequency $F_t$ and the speed of light c. Analysis of Equation 1 reveals that for low velocity targets, Equation 1 can be simplified into Equation 2 given $F_t$=10.5 GHz. Utilizing this information, the velocity of various targets may be determined by measuring the frequency shift.

In various UAV-based embodiments, the radar system is configured to both determine target velocity and to identify the target in question. Target velocity and identification may be accomplished through analysis of returns to the radar system 110. Most air vehicles, while in operation, include rotating components moving in a periodic manner, which may generate a unique Doppler signature for most vehicles. A priori knowledge of this signature may be utilized in real-time to determine the presence of a familiar target vehicle within the currently imaged scene. For example, the Align TRex-450Pro helicopter Doppler signature can be expressed as having frequency peaks described by Equation 3.

$$S_{Heli} = \left( \frac{2F\pi}{cT} \right) \left[ d_{mr} + d_p + \frac{d_{tr}}{1/4.24} \right] + Aux(T) \quad (3)$$

Where $d_{mr}$, $d_p$, and $d_{tr}$ are the diameters of the main rotor, paddles, and tail rotor, respectively. Note the scaling factor 4.24 applied to the tail rotor frequency component. This is due to the gear ratio between the main and tail rotors. $F_t$ is the transmit frequency, c is the speed of light, and T is the rotational period of the rotor system. Aux(T) represents additional components within the helicopter (the motor, main and tail rotor transmissions, drive shafts, etc). The model of this embodiment may be conceptualized as a representation of the velocities caused by the moving vehicle components. As each vehicle class is described by a different model, the quantity and location of frequency peaks act as a "fingerprint" for vehicles of the class. Although Equation 3 assumes the velocity of a rotating part is concentrated at a single point, in practice rotation is distributed over the length of the part, and the actual signatures observed in practice may be different enough that identification is generally possible.

For large-scale vehicles, and especially in the case of turbine powered systems, identification may also be based on sensing not only the larger aerodynamic components, but also the Doppler modulation caused by the power source. For example, Jet Engine Modulation is one known method of target identification in the absence of large periodically rotation parts (e.g. a helicopter rotor system) or when attempting to identify a non-cooperative target. However, traditional methods for identification generally involve the use of a parametric target model. Such a model is suitable for full scale vehicles due to the relatively small number of vehicle types and variants. However, on a typical miniature UAV scale (vehicles <25 kg) vehicle, the number of possible variants is significantly greater than for full scale vehicles. Some embodiments described herein use non-parametric models to avoid the manual generation of a parametric model for every UAV variant. Additionally, even in the absence of large (with respect to the wavelength of the carrier) or complex structures (such as jet engine compressors), identification of UAV-scale vehicles is still possible, according to various embodiments. In some embodiments, identification may be made through recognition of the integral vehicle components of smaller vehicles that may modulate electromagnetic radiation in a manner comparable to large scale systems.

The radar systems of embodiments described herein are designed to be deployed on a wide variety of miniature aerial vehicles and have both relatively low cost and relatively low mass. Referring again to FIG. 1, radar system 110 mounted to UAV 105 according to various embodiments may be implemented through, a modular approach to system components. In such embodiments, individual system components may be dispersed over the vehicle structure, thus, providing flexibility for UAV 105 mass distribution requirements. Table 1 describes several physical parameters of a radar of one embodiment. These physical parameters, coupled with the modular architecture, may be selected such that a number of different UAVs may be capable of supporting such a payload. Furthermore, a variety of different module combinations may be selected to suit a range of applications and scenarios. This enables an optimized sensing solution to be rapidly selected and implemented for a wide variety of UAV systems. For example, if a different transmit frequency is desired, the RF section of the radar may be changed. Likewise, if the current antenna arrangement is not suited for a particular application, another antenna may be used since the RF section of various embodiments may utilize industry standard waveguide components.

TABLE 1

| System Specifications | |
|---|---|
| System Mass | 230 grams |
| System Dimensions | 15.5, 10, 9 cm |
| Power Consumption | 4.5 Watts |
| Input Voltage Range | 10 to 42 VDC |
| Transmit Frequency | 10.5 GHz |
| Transmit Power | 10 mW |

Figure 2:
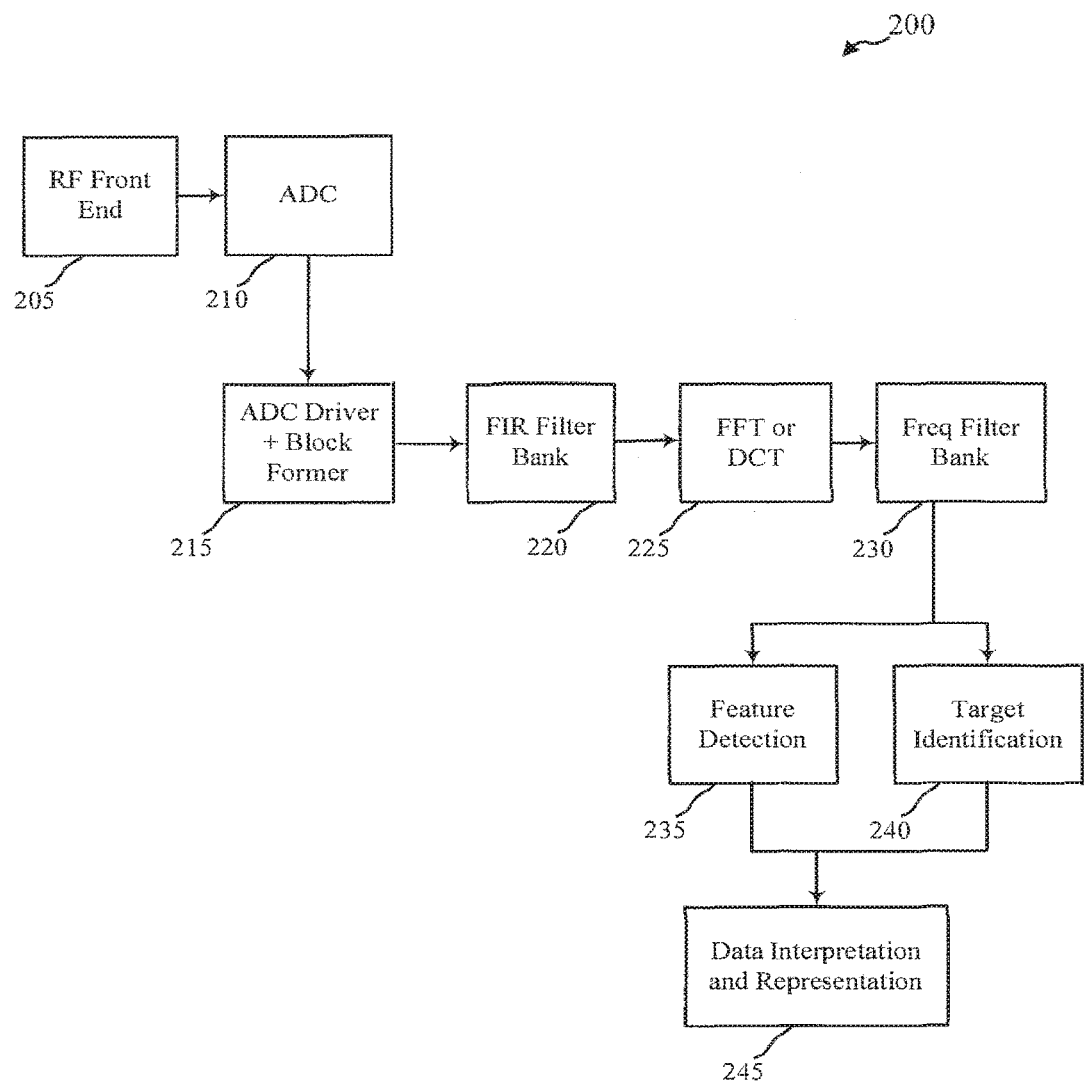
FIG. 2 is a block diagram of the operational modules included in an exemplary radar apparatus.

FIG. 2 is a block diagram of a radar system according to an embodiment. The first module to be described is the RF front end module 205. The RF front end module 205, according to some embodiments, generates, transmits, receives, and finally down-converts the received signal for use in subsequent stages. Several architectures may be used for the RF front end module 205, and in one embodiment a waveguide-based microwave device known as a Gunnplexer is used.

Figure 3:
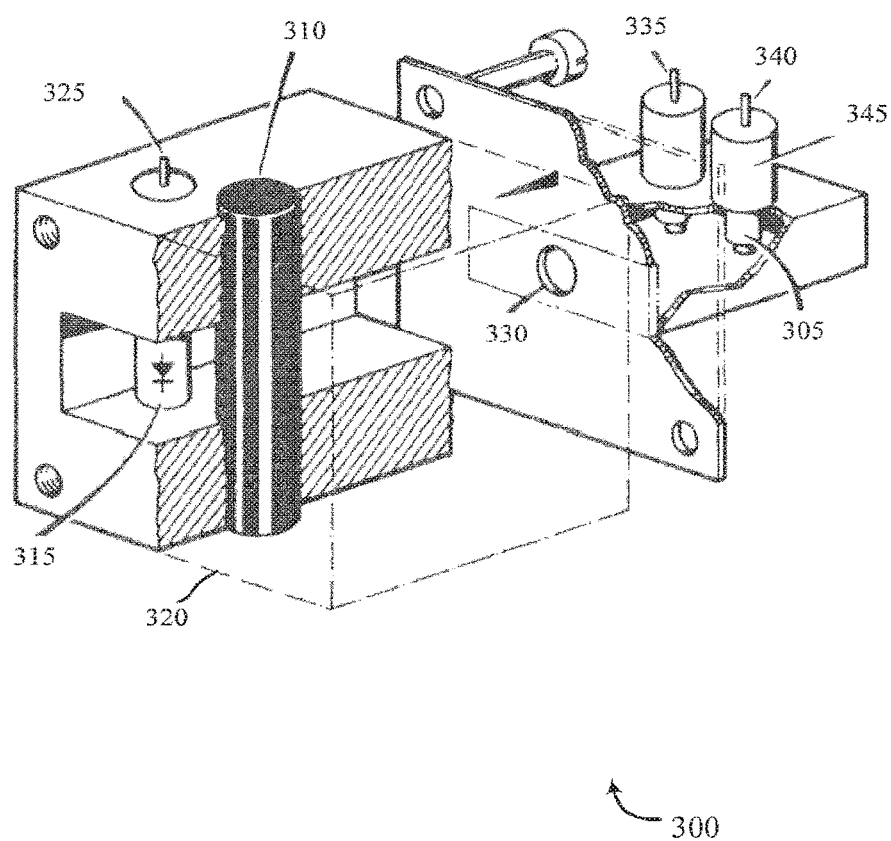
FIG. 3 is a perspective illustration, partially in cross-section, of an exemplary radar apparatus.

A gunnplexer 300 of an embodiment is illustrated in FIG. 3. The Gunnplexer 300 includes of a Gunn diode 305 mounted within a resonant cavity. Also located within the cavity are a ferromagnetic circulator 310 and a mixing diode 315. The Gunn diode 305 functions as a voltage-controlled microwave source. The microwave energy from the oscillator 300 is then divided between the mixing diode 315 and the antenna (not shown). The portion of the energy diverted to the mixing diode 315 functions as the local oscillator signal which is mixed with the portion of energy reflected from the target in mixer 320. This mixing process (frequency domain multiplication) produces an output 325 known as the Intermediate Frequency (defined as $\delta(F_L-F_T)$) in addition to other typically unwanted frequencies, see Equation 4. These unneeded frequencies are filtered at a later stage, according to various embodiments.

$$\text{Output} = \delta(F_L-F_T) + \delta(F_L-F_T) + (nF_T) + \delta(nF_L) \tag{4}$$

Iris 330 is located behind the mixer 320. A varactor bias input 335, and Gunn supply input 340 are provided, with appropriate RF chokes 345 as may be needed. The signals to and from the Gunnplexer 300 may be conveyed to and from the environment by means of an antenna whose primary function is to shape the electromagnetic radiation transmitted from the Gunnplexer, and to increase the range of the system by presenting a larger aperture to the return signals. Several antenna designs may be used, including helical, phased array patch, and parabolic antennas. In some embodiments, a horn antenna is used, which provides low mass, as such horn antennas can be fabricated from nearly any material, provided a conductive coating thicker than the skin depth is deposited on the interior. Horn antenna designs may also be fabricated from simple materials without depending on specific internal periodic structures as opposed to slotted waveguide arrays or phased array patch antennas. Horn antennas provide relatively good gain characteristics, given their complexity. A horn antenna may also provide direct coupling with the Gunnplexer assembly 300 with lower insertion loss. In other embodiments, different antennas may be used, which may require a waveguide to coaxial adapter in addition to other impedance matching structures within the antenna.

As radar systems of various different embodiments may be designed for miniature UAV applications, the antenna, and the resulting radiation pattern, of various embodiments is compatible with the carrying vehicle. For embodiments that employ rotorcraft-based airborne target detection, identification, and avoidance applications, a forward-looking field-of-view is desired. This requirement places a restriction on the maximum main lobe angle, otherwise undesired noise will be introduced into the system as a result of interaction between the antenna main lobe and the vehicle propulsion system. FIG. 1 demonstrates this situation for miniature helicopters. The main lobe angle of the antenna of FIG. 1 is approximately 26 degrees while the gain of the antenna is >17 dBi.

With reference again to FIG. 2, after undergoing the frequency domain multiplication described above, inbound signals pass through the intermediate frequency amplifier (IF amp) within the RF front end module 205. The primary function of the IF amp is to amplify the relatively weak signal resulting from the frequency down-conversion performed within the RF front end. Its secondary function is to filter the IF signal before and after each gain stage. This processing occurs in two stages, according to an embodiment. The first stage serves to present a mixing diode with a high impedance load and to attenuate undesirable signal characteristics. The first undesired characteristic is the input signal DC bias. This is caused both by imperfect isolation parameters within the Gunnplexer circulator as well as targets with no radial velocity. Both factors result in identical RF and LO frequencies which, after down-conversion, give rise to a DC voltage. The second unwanted signal is the high frequency (RF+LO) sum frequency. Following removal of these components, the signal voltage is amplified by a first gain stage $$\left(\text{gain} = 11\frac{v}{v}\right).$$

Subsequent to the first gain stage, in this embodiment, the signal is sent through a high pass filter to remove the DC offset generated by the first gain stage and remove low frequency interference (e.g., 60/50 Hz mains frequencies, motor speed controllers, etc.) present within the signal. Finally, the signal is sent through the second gain stage $$\left(\text{gain} = 6267\frac{v}{v}\right)$$

and is ready for digitization at ADC 210. The total voltage gain of the IF amplifier of an embodiment is $$68{,}937\frac{v}{v}.$$

In one embodiment, order to further reduce the influence of noise on the system, the IF amp is mounted directly on the Gunnplexer body. This reduces the length of conductor that carries the low voltage signal from the mixing diode.

Once the signal has been received and amplified by the analog modules of the RF front end 205, it is digitized at ADC module 210. In one embodiment, digitization is performed by means of a 16-bit, 250 ksps, analog digital converter. The Shannon-Nyquist theorem states that to accurately measure a signal without aliasing, one must sample the signal at twice the maximum frequency present within the signal. In the example described herein, sampling is done on the IF signal, so application of Doppler equation to equations (1) and (2), results in, given a sampling frequency of 250 ksps, a maximum measurable frequency of 125 ksps, which corresponds to a maximum measurable target velocity of 1784 m/s. In practice, for most UAV applications, the need to track objects with this velocity is unlikely due to the relatively low cruising speeds typical of most relatively small UAVs. Thus, the ADC sample rate may be varied to form a compromise between target velocity ranges, velocity resolution, and system memory limits. The varying sample rate is achieved by introducing a delay after each ADC sample. Upon sampling, in one embodiment, on-board processing is performed on a microprocessor, such as a 1600 MIPS, four core, multi-threaded, microprocessor (XMOS XS1-G4).

Figure 4:
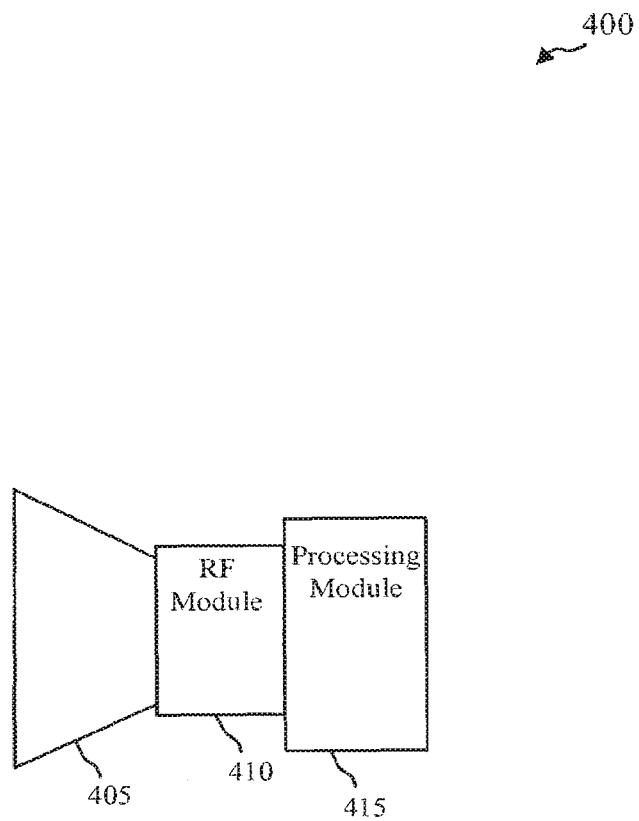
FIG. 4 is an illustration of an exemplary radar apparatus illustrating electronic components and a horn.
Figure 5:
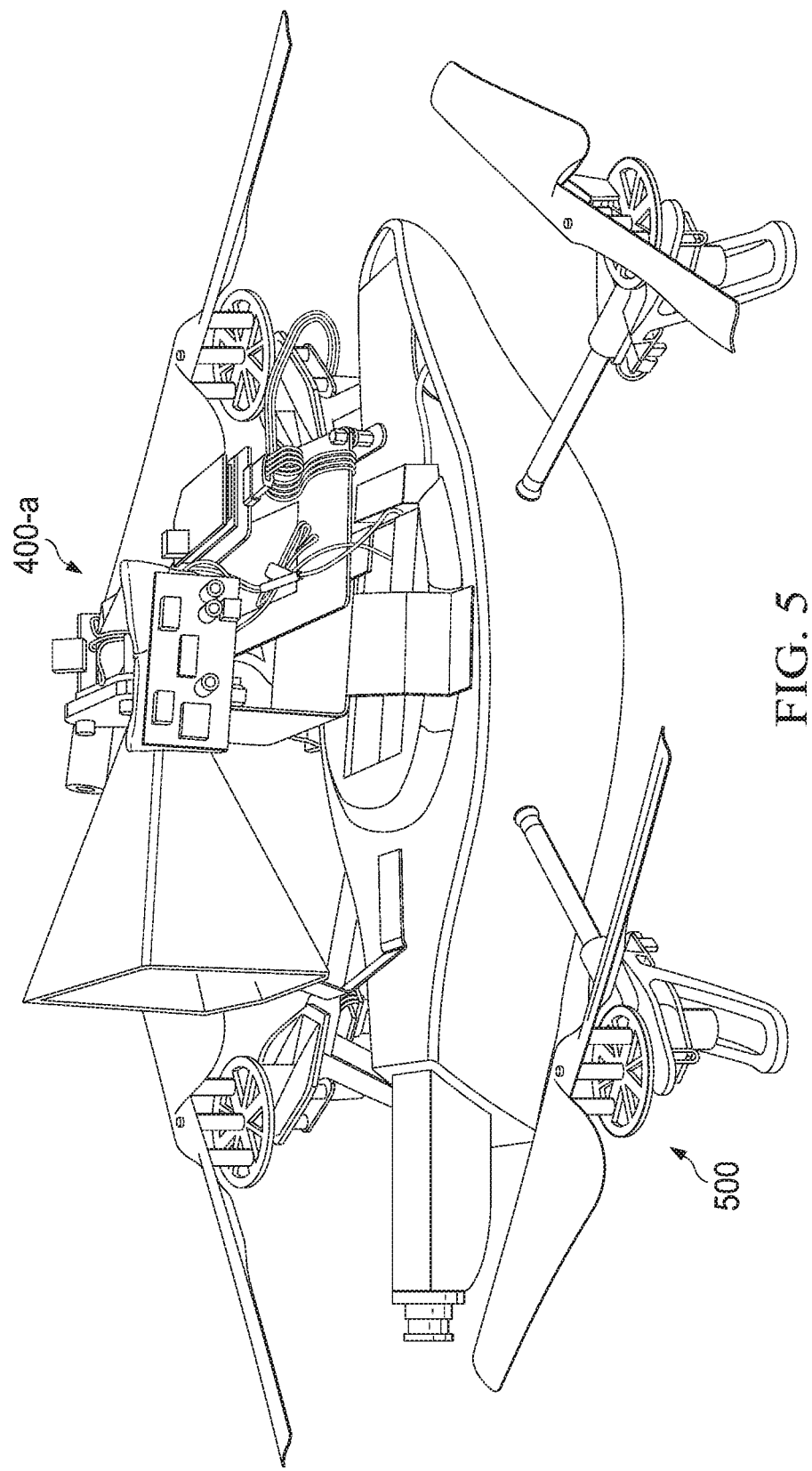
FIG. 5 is an illustration of another exemplary unmanned aerial vehicle and a radar of another set of embodiments.

With reference to FIG. 4, an illustration of a complete radar system 400 is provided. System 400, of this embodiment, includes antenna 405, illustrated as a horn antenna, RF module 410 which may include an RF section and analog amplifier as described above, and a processing module 415. Processing module 415, according to some embodiments, includes signal processing boards and wireless telemetry components. The system 400 may include mounting brackets and hardware to facilitate mounting to a UAV. An example of a radar system 400-*a* mounted on a low-cost, commercially available quadrotor, the Parrot AR drone is illustrated in FIG. 5.

The on-board processing software of various embodiments includes several discrete modules, which are described with continuing reference to FIG. 2. In one embodiment these include an ADC driver and block former module 215, a FIR filter bank module 220, an FFT (or DCT) module 225, and a frequency filter bank module 230, which may be implemented on a microprocessor as tasks, with the arrows between the modules representing unidirectional data channels. The use of channels as illustrated in FIG. 2 for inter-task communication reduces the need for sophisticated (and error prone) synchronization to protect shared global memory, and allows each task to perform blocking I/O on the ports/channels it is concerned with. In some embodiments, each module may be executed, in parallel, as a distinct task. According to one embodiment, a scheduler on a microprocessor ensures that all tasks are scheduled fairly and with great regularity, such as through round-robin among the active tasks for a single instruction. The ADC Driver module 215 may sample the ADC continuously and generate data packets that are forwarded to the other modules. The size of the data packets is variable as a function of the desired frequency resolution and velocity range. In one embodiment a fixed size of 512 samples is used. The FIR filter module 220 may serve to eliminate variable noise that was not attenuated by the IF amplifier module. This approach is effective as digital filters can provide steep rolloff rates, and can be implemented within a DSP, for example, as dictated by application requirements. For example, if the UAV is operating near power lines, a 60 Hz FIR notch filter can be introduced to enable successful operation. The Fast Fourier Transform (FFT) (or DCT) module 225 performs operations required to generate frequency domain information. The frequency filter bank module 230 is an additional digital filter block used to filter the frequency domain signal representation. This filtering is used to reduce or eliminate erroneous target information and increases the reliability and simplicity of subsequent processing blocks. The result of these four software or hardware modules is a 256-sample frequency-domain signature that is now ready for use in target detection and identification. Target detection and identification, according to some embodiments, may be performed by feature detection module 235, target identification module 240, and data interpretation and representation module 245.

Target data processing can be divided into two generalized scenarios: point target detection and complex target identification. In the first scenario, the target(s) may include a single object with either no or ignored internal structure. That is to say, the entire target object and all components may be considered to be traveling at the same velocity. In this mode, identification may not be possible, but target velocity is readily available. Multiple targets can be detected and their velocities (relative to the Poynting vector) can be determined. However this functionality is limited by the velocity differences between the individual targets and the Doppler-generated bandwidth occupied by the targets. The second scenario is characterized by a target of suitable complexity within the radar main lobe. In this situation, a complex target is defined as having numerous periodically moving parts. High levels of complexity are required for reliable system operation.

Figure 6:
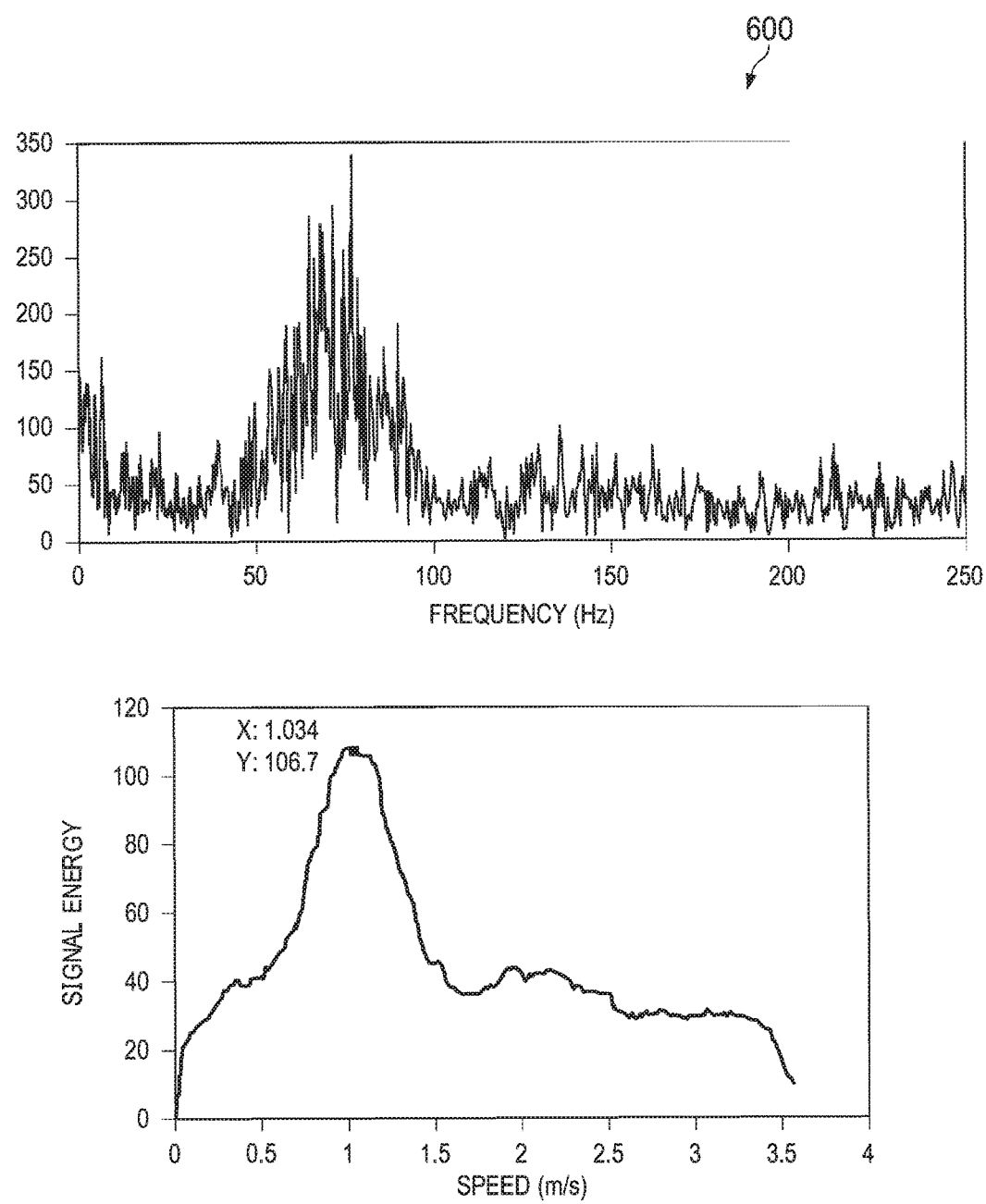
FIG. 6 is a chart of FFT data and an output of a peak finding algorithm according to an embodiment.

With reference first to simple "point" targets, target velocity information, for simple scenarios, may be determined by applying a smoothing filter (low-pass or median) to the raw FFT data then executing a peak finding algorithm to determine the main target velocity. Equation 2 can then be used to obtain the target velocity in m/s. This procedure is illustrated in FIG. 6. The target utilized to generate the data in FIG. 6 was a human walking directly toward the radar antenna. Additional details related to the point target reveal the advantages of the smoothing filter and a priori knowledge of the types of signals expected. For example, the target of FIG. 6 was swinging her arms while walking toward the antenna. Moreover, in this example, there were other additional sources of motion (e.g., clothing, legs, etc.) whose motion was not completely parallel to the main lobe Poynting (propagation) vector. This results in target spectral broadening. Because other targets tend to have similar movement patterns, a priori knowledge may be needed to determine the type of post-processing required to extract the desired information. For example: multiple targets traveling at similar velocities (relative to the radar antenna) would have their individual signatures merged into a single average velocity after the filtering operation.

Figure 7:
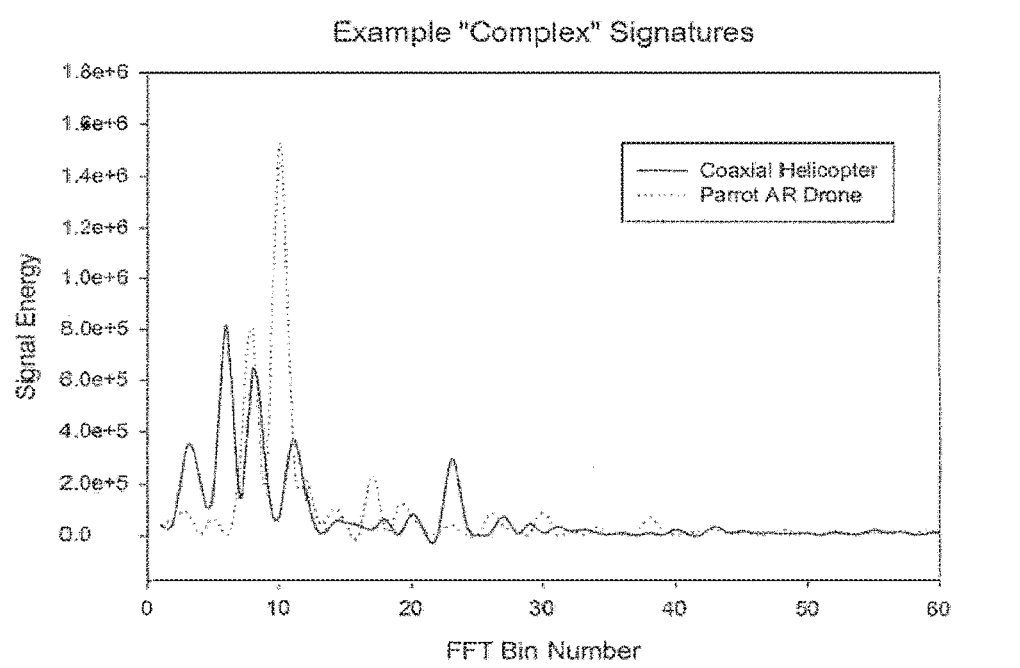
FIG. 7 is an example of signal energy for complex signals of various embodiments.

Targets assumed to be "complex" are evaluated in a different manner, according to some embodiments. This is due to the presence of a relatively predictable signal structure that enables target identification. The nature of the signals can be seen, for an example, in FIG. 7. FIG. 7 displays the instantaneous Doppler frequencies of two miniature vehicles: a coaxial rotor helicopter (E-Sky Lama v4), a commercially available quadrotor (Parrot AR Drone). When compared with the radar signature of a human, the rotorcraft exhibit a less complex signature. Examination of FIG. 7 shows the majority of signal energy is present in the lower frequencies. While the signals generated by the down-conversion process bear higher frequency components, these higher frequencies are filtered by the IF amplifier module leaving their lower frequency harmonics. Such a characteristic may be advantageous in that it can be used to determine the velocity of the target relative to the radar. This may be accomplished by reducing the number of samples that comprise a signature from 256, and sliding this truncated target signature along the 256-sample scene signature, determining the match quality at each point. If the best match occurs at a non-zero offset, then the target bears a radial velocity corresponding to the offset.

As described earlier, advanced control strategies for unmanned UAVs require both detection and identification of one or more targets that may be in proximity to the UAV. In order to detect the presence of a target of interest, various embodiments provide an ability to differentiate a given signature from the background scene within the range of the radar. In order to identify different targets, embodiments provide an ability to determine that a given signature matches one of a database of pre-recorded signatures of vehicle classes of interest. Fundamentally, both of these operations involve comparing a given "live" signature, with a library of pre-recorded signatures and determining which is the best match. In various embodiments, both the background signature and vehicle signatures are represented within a signature library, thereby allowing the system to perform detection and identification in the same computational step (i.e., if the live signature matches the background signature the best, then there is no target of interest within range).

As described above, one of the computational operation performed by the radar system is to match an incoming "live" signature against a library of pre-recorded vehicle signatures. In order to evaluate different algorithms efficiently, the system of an embodiment unitizes the data collection mode of the radar to record a number of 256-sample signatures for vehicles of interest. Signatures may be acquired by, for example, having the radar system and target vehicles placed inside a reinforced concrete room. In one embodiment, the range between the radar system and target vehicles is fixed at 3 meters (10 feet). The linear separation distance between each vehicle was 0.6 m resulting in an angular separation of 11.31°. The vehicle signatures are recorded by fixing the vehicle to the floor of the test room and throttling the rotor system to typical flight speeds. The radar system is then pointed at the target vehicle and a series of signatures are streamed back to the attendant PC over a dedicated (wired) serial link; 160 of these signatures are gathered per vehicle and saved into a log file. Identification is performed by calculating the best match across all vehicles using the algorithms described below.

Various embodiments use different algorithms to compute a single match value when executed on a library signature and live signature pair. The vehicle corresponding to the library signature that exhibits the best match with the live signature is selected. Several algorithms may be used, such as:

Sum of Absolute Differences (SAD)—The total difference between the two signatures is calculated by adding the absolute value of differences between the 256 samples. The match with the smallest total differences is taken as best.

Sum of Squared Differences (SSD)—The total difference between the two signatures is calculated by adding the square of differences between the 256 samples. The match with the smallest total difference is taken as best.

Euclidean Distance (ED)—The total distance between the two signatures is calculated by taking the square root of the sum of squared differences. The match with the smallest total difference is taken as best.

Correlation (C)—The correlation between the two signatures is calculated by taking the average pairwise product of the 256 samples. The match with the maximum correlation is taken as the best.

Figure 8:
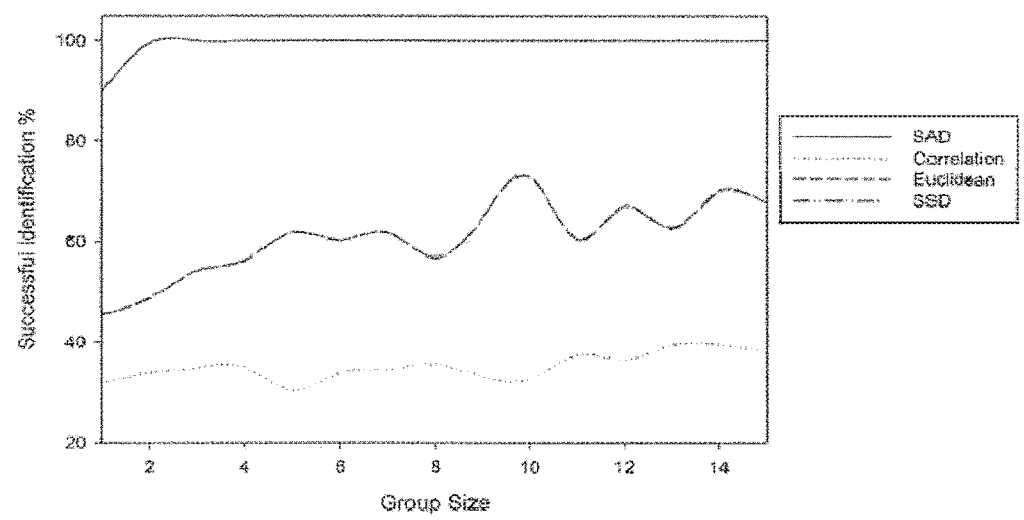
FIG. 8 is an chart of different matching methods.

The results of an exemplary evaluation are depicted in FIG. 8. The vertical axis contains the percentage of correct matches, while the horizontal axis represents the varying number of raw signatures being averaged. The algorithm with the best performance in this embodiment is the SAD algorithm which exhibits almost perfect accuracy when at least 3 signatures are averaged. The SSD and ED algorithms exhibit moderate performance, and the Correlation algorithm performs relatively poorly.

Utilizing the systems and algorithms described above, the radar system may differentiate between live targets. Identification begins by recording the background Doppler signature which is then subtracted from subsequent measurements. The library signatures are stored in non-volatile memory on board the radar processor, or transmitted to the radar by the UAVs mission control system as needed.

Figure 9:
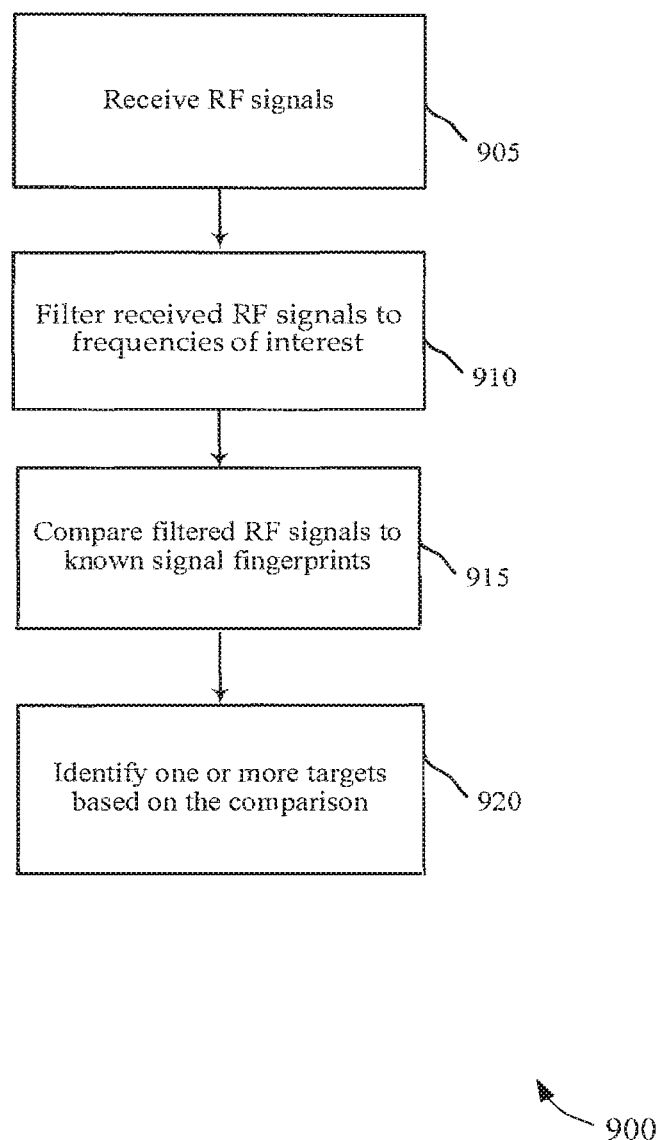
FIG. 9 is a flow chart illustration of exemplary operational steps for detection and avoidance of aerial vehicles and other objects according to a set of embodiments.

With reference now to FIG. 9, operational steps 900 of an embodiment are described. The operations of FIG. 9 may be performed, for example, by one or more of the modules discussed with respect to FIGS. 2 and 3. Initially, at block 905, RF signals are received at an antenna located on the UAV. The RF signals are then filtered, as discussed above, at block 910. The filtered signals are compared to known signal fingerprints, at block 915. As mentioned above, various known fingerprints may be stored in a library or database, and comparisons made to the signatures in the library. The library of fingerprints may be stored in an on-board memory module, and in various embodiments may be periodically updated. Based on the comparison, one or more targets are identified, at block 920. Avoidance maneuvers may be initiated based on the target identification, similarly as discussed above.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. An unmanned aerial vehicle (UAV) radar apparatus, comprising:
an RF front end module comprising an antenna and configured to transmit and receive RF signals;
a filtering module coupled with the RF front end module that filters RF signals received at the RF front end module, the filtering module comprising:
an analog-to-digital converter (ADC), wherein a sample rate of the ADC is variable,
an on-board processor comprising:
an ADC driver and block former module configured to generate data packets of variable sizes,
an FIR frequency filter bank module configured to eliminate variable noise,
a Fast Fourier Transform module or Discrete Cosine Transform module configured to generate frequency domain information, and
frequency filter bank module configured to filter the frequency domain information; and
a target data processing module coupled with the filtering module configured to detect one or more targets based on the filtered RF signals and identify the one or more detected targets based on signatures present in the filtered RF signals,
wherein the UAV radar apparatus is small enough to be mounted on a UAV having a maximum vehicle takeoff weight of less than 20 kilograms, and wherein each of the RF front end module, filtering module, and processing module are interchangeable components, and each of the RF front end module and the filtering module are dispersible over the UAV.

2. The apparatus of claim 1, wherein the RF front end module comprises a waveguide-based microwave device.

3. The apparatus of claim 2, wherein the waveguide-based microwave device comprises a gunnplexer.

4. The apparatus of claim 1, wherein the target data processing module is configured to execute signature matching algorithms for differentiating aircraft by their Doppler signature.

5. The apparatus of claim 1, further comprising a memory coupled with the target data processing module.

6. The apparatus of claim 5, wherein the memory comprises a plurality of pre-recorded signatures of vehicle classes of interest.

7. The apparatus of claim 1, further comprising a control module coupled with the target data processing module.

8. The apparatus of claim 7, wherein the control module is operable to control the UAV to avoid one or more targets responsive to the detection and identification of one or more targets based on the filtered RF signals.

9. The apparatus of claim 7, wherein the control module is operable to change one or more of altitude, direction of travel, or speed of the UAV.

10. The apparatus of claim 1, wherein the UAV is a miniature UAV.

11. The apparatus of claim 1, wherein the apparatus weighs 230 grams or less.

12. A method for target detection in an unmanned aerial vehicle (UAV) having a maximum vehicle takeoff weight of 20 kilograms, comprising:
   receiving RF signals at an antenna located on the UAV;
   filtering the received RF signals at a filtering module to frequencies of interest, wherein the filtering comprises:
      sampling a frequency, at an analog-to-digital converter (ADC), wherein a sample rate of the ADC is variable,
      generating, at an ADC driver and block former on an on-board processor, data packets of variable sizes,
      eliminating variable noise at an FIR frequency filter bank module,
      generating frequency domain information at a Fast Fourier Transform module or Discrete Cosine Transform module, and
      filtering the frequency domain information at a frequency filter bank module;
   comparing, at a processing module, the filtered RF signals to known signal fingerprints, wherein the comparing comprises identifying one or more signatures based on the filtered RF signals and comparing the one or more signatures to known background fingerprints and known target footprints; and
   identifying one or more targets based on the comparison, wherein each of the antenna, filtering module, and processing module are interchangeable components, and each of the antenna and filtering module are dispersible over the UAV.

13. The method of claim 12, wherein the comparing comprises executing signature matching algorithms for differentiating aircraft by their Doppler signature.

14. The method of claim 12, wherein the comparing comprises accessing a memory coupled with the target data processing module.

15. The method of claim 14, wherein the memory comprises a plurality of pre-recorded signatures of vehicle classes of interest.

16. The method of claim 12, further comprising: controlling the UAV to avoid one or more targets based on the identifying.

17. The method of claim 16, wherein the controlling comprises controlling the UAV to change one or more of altitude, direction of travel, or speed.

18. The method of claim 12, wherein the antenna comprises a waveguide-based microwave device.

19. The method of claim 18, wherein the waveguide-based microwave device comprises a gunnplexer.

20. An unmanned aerial vehicle (UAV) radar apparatus, comprising:
   an RF front end module comprising an antenna and configured to transmit and receive RF signals;
   a filtering module coupled with the RF front end module that filters RF signals received at the RF front end module, the filtering module comprising:
      an analog-to-digital converter (ADC), wherein a sample rate of the ADC is variable,
      an on-board processor comprising:
         an ADC driver and block former module configured to generate data packets of variable sizes,
         an FIR frequency filter bank module configured to eliminate variable noise,
         a Fast Fourier Transform module or Discrete Cosine Transform module configured to generate frequency domain information, and
      frequency filter bank module configured to filter the frequency domain information; and
   a target data processing module coupled with the filtering module that:
      detects one or more targets based on the filtered RF signals; and
      identifies both large and small aerial vehicle targets by comparing signatures generated by the received and filtered RF signals to a library of previously known signatures of large and small aerial vehicles stored in a memory coupled to the processing module; and
      determines a velocity of an identified vehicle target via continuous wave radar,
      wherein each of the RF front end module, filtering module, and target data processing module are interchangeable components, and each of the RF front end module and the filtering module are dispersible over a small or miniature UAV.

* * * * *